(12) United States Patent
Sassone et al.

(10) Patent No.: US 10,025,711 B2
(45) Date of Patent: Jul. 17, 2018

(54) HYBRID WRITE-THROUGH/WRITE-BACK CACHE POLICY MANAGERS, AND RELATED SYSTEMS AND METHODS

(75) Inventors: Peter G. Sassone, Austin, TX (US); Christopher Edward Koob, Round Rock, TX (US); Dana M. Vantrease, Austin, TX (US); Suresh K. Venkumahanti, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 13/470,643

(22) Filed: May 14, 2012

(65) Prior Publication Data
US 2013/0185511 A1 Jul. 18, 2013

Related U.S. Application Data

(60) Provisional application No. 61/586,937, filed on Jan. 16, 2012.

(51) Int. Cl.
*G06F 13/00* (2006.01)
*G06F 12/0804* (2016.01)
(Continued)

(52) U.S. Cl.
CPC ........ *G06F 12/0804* (2013.01); *G06F 1/3275* (2013.01); *G06F 1/3287* (2013.01);
(Continued)

(58) Field of Classification Search
CPC combination set(s) only.
See application file for complete search history.

(56) References Cited

U.S. PATENT DOCUMENTS

| 5,301,298 A | 4/1994 | Kagan et al. |
| 5,522,057 A | 5/1996 | Lichy |

(Continued)

FOREIGN PATENT DOCUMENTS

| CN | 1612113 A | 5/2005 |
| CN | 101088076 A | 12/2007 |
| EP | 0342846 A2 | 11/1989 |

OTHER PUBLICATIONS

Bournoutian G et al., "Dynamic, Multi-Core Cache Coherence Architecture for Power-Sensitive Mobile Processors", Hardware/Software Codesign and System Synthesis (CODES+ISSS), 2011 Proceedings of the 9th International Conference on, IEEE, 2 Penn Plaza, Suite 701 New York NY 10121-0701 USA, Oct. 9, 2011 (Oct. 9, 2011), pp. 89-97, XP032065426, ISBN: 978-1-4503-0715-4.

(Continued)

*Primary Examiner* — Charles Rones
*Assistant Examiner* — Han Doan
(74) *Attorney, Agent, or Firm* — W&T/Qualcomm

(57) ABSTRACT

Embodiments disclosed in the detailed description include hybrid write-through/write-back cache policy managers, and related systems and methods. A cache write policy manager is configured to determine whether at least two caches among a plurality of parallel caches are active. If all of one or more other caches are not active, the cache write policy manager is configured to instruct an active cache among the parallel caches to apply a write-hack cache policy. In this manner, the cache write policy manager may conserve power and/or increase performance of a singly active processor core. If any of the one or more other caches are active, the cache write policy manager is configured to instruct an active cache among the parallel caches to apply a write-through cache policy. In this manner, the cache write policy (Continued)

manager facilitates data coherency among the parallel caches when multiple processor cores are active.

28 Claims, 6 Drawing Sheets

(51) Int. Cl.
  *G06F 1/32* (2006.01)
  *G06F 12/0806* (2016.01)
  *G06F 12/0846* (2016.01)
(52) U.S. Cl.
  CPC ...... *G06F 12/0806* (2013.01); *G06F 12/0846* (2013.01); *G06F 2212/1028* (2013.01); *G06F 2212/502* (2013.01); *Y02D 10/13* (2018.01); *Y02D 10/14* (2018.01); *Y02D 10/171* (2018.01)

(56) References Cited

U.S. PATENT DOCUMENTS

| | | | |
|---|---|---|---|
| 6,052,789 A | 4/2000 | Lin | |
| 6,571,324 B1* | 5/2003 | Elkington | G11C 29/74 |
| | | | 711/120 |
| 6,711,691 B1 | 3/2004 | Howard et al. | |
| 2004/0162950 A1* | 8/2004 | Coulson | G06F 12/0804 |
| | | | 711/141 |
| 2005/0195635 A1 | 9/2005 | Conley et al. | |
| 2006/0143406 A1* | 6/2006 | Chrysos | G06F 12/0804 |
| | | | 711/143 |
| 2008/0082856 A1* | 4/2008 | French | G06F 11/2089 |
| | | | 714/2 |
| 2009/0327780 A1* | 12/2009 | Dawkins | G06F 1/3221 |
| | | | 713/323 |
| 2010/0122008 A1* | 5/2010 | Goss | G06F 1/3203 |
| | | | 710/264 |
| 2010/0332753 A1* | 12/2010 | Gray | G06F 12/0831 |
| | | | 711/118 |
| 2011/0271126 A1 | 11/2011 | Hill | |
| 2013/0097458 A1* | 4/2013 | Sekino | G06F 11/1441 |
| | | | 714/6.3 |

OTHER PUBLICATIONS

International Search Report and Written Opinion—PCT/US2013/021774—ISA/EPO—dated Jun. 12, 2013.
Jimenez V et al., "Characterizing Power and Temperature Behavior of POWER 6-Based System", IEEE Journal on Emerging and Selected Topics in Circuits and Systems, IEEE, Piscataway, NJ, USA, vol. 1, No. 3, Sep. 1, 2011 (Sep. 1, 2011), pp. 228-241, XP011369757, ISSN: 2156-3357, DOI: 10-1109/JETCAS.2011.2169630.
Taiwan Search Report—TW102101719—TIPO—dated Dec. 5, 2014.

* cited by examiner

HYBRID WRITE-THROUGH/WRITE-BACK CACHE POLICY MANAGERS, AND RELATED SYSTEMS AND METHODS

PRIORITY APPLICATION

The present application claims priority to U.S. Provisional Patent Application Ser. No. 61/586,937 filed on Jan. 16, 2012 and entitled "HYBRID WRITE-THROUGH/WRITE-BACK POLICY FOR CACHES, AND RELATED SYSTEMS AND METHODS," which is hereby incorporated herein by reference in its entirety.

BACKGROUND

I. Field of the Disclosure

The technology of the disclosure relates to multiprocessors, wherein each processor core of the multiprocessor has its own local cache and shares a common cache and/or main memory.

II. Background

A processor cache can be configured to implement a write-back cache policy or a write-through cache policy. A write-through cache policy writes-through all data stored in the cache to a next-level cache(s). For example, a first-level write-through cache can write-through all data stored in the first-level cache to a next-level cache. A write-through cache policy ensures that each first-level cache does not contain dirty data, because the data stored in the cache is written through to the next-level cache. However, writing through every data store to a next-level cache consumes additional power due to writing through data to the next level cache. As such, a write-through cache policy may not be ideal for lower-power devices.

On the other hand, a cache configured with a write-back cache policy (i.e., a write-back cache) collects dirty data in the cache until eviction. Write-back caches may consume less power, because writes to the first-level cache are collected and not written-through before eviction. However, a multiprocessor system including write-back caches may be more complicated. For example, dirty data in the write-back caches may need to be snooped out to provide data coherency. Furthermore, during design and testing phases, debugging data coherency issues can consume time.

SUMMARY OF THE DISCLOSURE

Embodiments disclosed in the detailed description include hybrid write-through/write-back cache policy managers, and related systems and methods. In this regard in one embodiment, a cache write policy manager is provided. The cache write policy manager is configured to determine whether at least two caches among a plurality of parallel caches are active. Parallel caches share one or more common lineage parent) cache(s) or memory(ies), either directly or indirectly through an intermediate caches(s) or intermediate memory(ies), wherein coherency should be maintained. An active cache is a cache which is in use. If all of the one or more other caches among the plurality of parallel caches are not active, the cache write policy manager is configured to instruct an active cache among the plurality of parallel caches to apply a write-back cache policy. In this manner, the cache write policy manager may conserve power and/or increase performance when only a single processor core among a plurality of parallel processor cores is active. If any of the one or more other caches among the plurality of parallel caches are active, the cache write policy manager is configured to instruct an active cache among the plurality of parallel caches to apply a write-through cache policy. In this manner, the cache write policy manager facilitates data coherency among the parallel caches when multiple processor cores among the plurality of parallel processor cores are active.

In another embodiment, a means for providing a hybrid write-through/write-back cache policy for a cache is provided. The means comprises a means for determining whether at least two caches among a plurality of parallel caches are active. The means further comprises a means for instructing an active cache among the plurality of parallel caches to apply a write-back cache policy if all of one or more other caches among the plurality of parallel caches are not active. The means further comprises a means for instructing an active cache among the plurality of parallel caches to apply a write-through cache policy if any of the one or more other caches among the plurality of parallel caches are active.

In another embodiment, a method for providing a hybrid write-through/write-back cache policy for a cache is provided. The method comprises determining whether at least two caches among a plurality of parallel caches are active. The method further comprises instructing an active cache among the plurality of parallel caches to apply a write-back cache policy if all of the one or more other caches among the plurality of parallel caches are not active. The method further comprises instructing an active cache among the plurality of parallel caches to apply a write-through cache policy if any of the one or more other caches among the plurality of parallel caches are active.

In another embodiment, a cache is provided. The cache comprises a cache memory, and a cache controller configured to set a cache write policy of the cache memory. The cache controller is further configured to set a write-back cache policy for the cache memory in response to receipt of an indication that all of one or more other caches among a plurality of parallel caches are not active. The cache controller is further configured to set a write-through cache policy for the cache memory in response to receipt of an indication that any of the one or more other caches among a plurality of parallel caches are active.

In another embodiment, a multiprocessor system is provided. The multiprocessor system comprises a plurality of parallel caches, and a shared memory shared by the plurality of parallel caches. The multiprocessor system also comprises a cache write policy manager configured to determine whether at least two caches among the plurality of parallel caches are active. The cache write policy manager is further configured to instruct an active cache among the plurality of parallel caches to apply a write-back cache policy if all of one or more other caches among the plurality of parallel caches are not active. The cache write policy manager is further configured to instruct an active cache among the plurality of parallel caches to apply a write-through cache policy if any of the one or more other caches among the plurality of parallel caches are active.

In another embodiment, a non-transitory computer-readable medium is provided. The computer-readable medium has stored thereon computer-executable instructions to cause a processor to provide a hybrid write-through/write-back cache policy for a plurality of parallel caches. The instructions cause the processor to determine whether at least two caches among the plurality of parallel caches are active. The instructions further cause the processor to instruct an active cache among the plurality of parallel caches to apply a write-back cache policy if all of one or more other caches among the plurality of parallel caches are not active. The instructions further cause the processor to instruct the active cache among the plurality of parallel caches to apply a write-through cache policy if any of the one or more other caches among the plurality of parallel caches are active.

DETAILED DESCRIPTION

Embodiments disclosed in the detailed description include hybrid write-through/write-back cache policy managers, and related systems and methods. In this regard in one embodiment, a cache write policy manager is provided. The cache write policy manager is configured to determine whether at least two caches among a plurality of parallel caches are active. Parallel caches share one or more common lineage (i.e., parent) cache(s) or memory(ies), either directly or indirectly through an intermediate caches(s) or intermediate memory(ies), wherein coherency should be maintained. An active cache is a cache which is in use. If all of one or more other caches among the plurality of parallel caches are not active, the cache write policy manager is configured to instruct an active cache among the plurality of parallel caches to apply a write-back cache policy. In this manner, the cache write policy manager may conserve power and/or increase performance when only a single processor core among a plurality of parallel processor cores is active. If any of the one or more other caches among the plurality of parallel caches are active, the cache write policy manager is configured to instruct an active cache among the plurality of parallel caches to apply a write-through cache policy. In this manner, the cache write policy manager facilitates data coherency among the parallel caches when multiple processor cores among the plurality of parallel processor cores are active.

Figure 1:
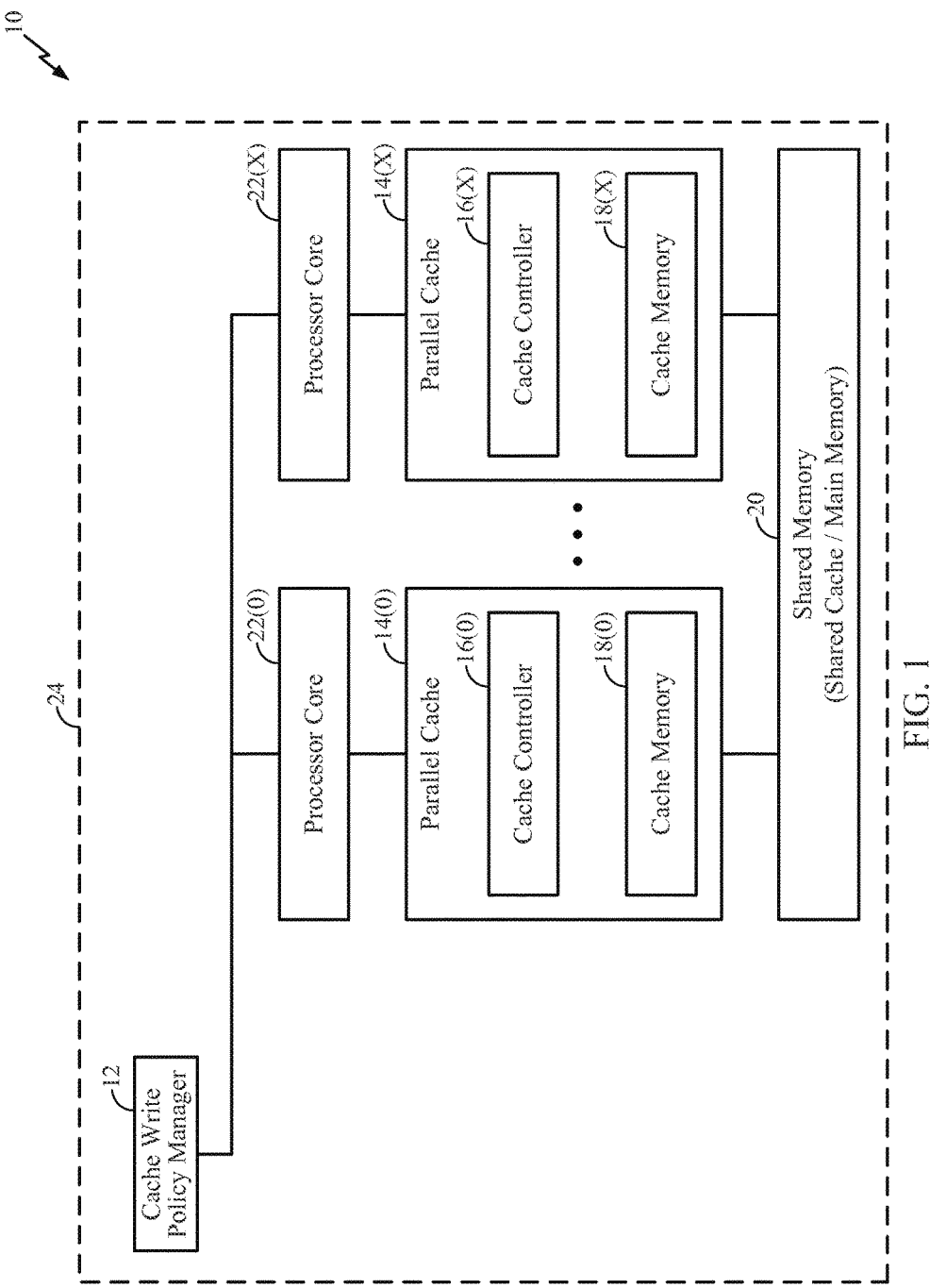
FIG. 1 is a block diagram of an exemplary multiprocessor system comprising an exemplary cache write policy manager configured to provide a hybrid write-through/write-back cache policy.

FIG. 1 is a block diagram of an exemplary multiprocessor system 10 comprising a plurality of parallel processor cores 22(0)-22(X). Each processing core 22(0)-22(X) accesses a local parallel cache 14(0)-14(X) comprising a cache controller 16(0)-16(X) and a cache memory 18(0)-18(X). The caches 14(0)-14(X) in FIG. 1 are parallel caches, because they share a common lineage shared memory 20. As illustrated in FIG. 1, the parallel caches 14(0)-14(X) may be first-level caches for the processors cores 22(0)-22(X). Alternatively, the parallel caches 14(0)-14(X) may be higher-level caches, for example second-level or third-level caches of the processor cores 22(0)-22(X). The parallel caches 14(0)-14(X) share a shared memory 20. The shared memory 20 may be a shared cache, for example, a second-level cache. The shared memory 20 may also be a main memory. As also illustrated in FIG. 1, the multiprocessor system 10 may be integrated into a semiconductor die 24.

A multiprocessor system may spend some of its operating time having a single processor core active. Therefore, it may be beneficial to optimize the multiprocessor system 10 to consume less power when operating with a single processor core 22(0) active. From time to time, when increased performance is required, one or more other processor cores 22(X) of the multiprocessor system 10 may be activated to provide increased processing capacity for the multiprocessor system 10. Additional power may be consumed by the multiprocessor system 10 when more than one of the processor cores 22(0)-22(X) are active; however, the increased power consumed by the multiprocessor system 10 may only occur during periods of time when increased bursts of performance may be required.

In this regard, the multiprocessor system 10 comprises a cache write policy manager 12 configured to provide a hybrid write-through/write-back cache policy. The cache write policy manager 12 is configured to manage the cache write policy of a plurality of parallel caches 14(0)-14(X). The cache write policy manager 12 is configured to determine whether at least two parallel caches 14(0)-14(X) are active. The cache write policy manager 12 is configured to instruct an active cache 14(0) among the plurality of parallel caches 14(0)-14(X) to apply a write-back cache policy if all of one or more other caches 14(X) among the plurality of parallel caches 14(0)-14(X) are not active. In this manner, the cache write policy manager 12 may conserve power and/or increase performance of the multiprocessor system 10 when only a single processor core 22(0) among a plurality of parallel processor cores 22(0)-22(X) is active. For example, the cache write policy manager 12 may be configured to instruct the active cache 14(0) among the plurality of parallel caches 14(0)-14(X) to apply a write-back cache policy when all of the other caches 14(X) among the plurality of parallel caches 14(0)-14(X) become inactive.

Also, the cache write policy manager 12 is also configured to instruct an active cache 14(0) among the plurality of parallel caches 14(0)-14(X) to apply a write-through cache policy if any of the one or more other caches 14(X) are active. In this manner, the cache write policy manager 12 facilitates data coherency among the parallel caches 14(0)-14(X) when multiple processor cores 22(0)-22(X) among the plurality of parallel processor cores 22(0)-22(X) are active.

The cache write policy manager 12 is configured to send instructions to the cache controllers 16(0)-16(X) of the parallel caches 14(0)-14(X) to implement the hybrid write-through/write-back cache policy. The cache write policy manager 12 is configured to instruct the desired cache write policy to be set for the parallel caches 14(0)-14(X). The cache controller 16(0) is configured to receive the instructions from the cache write policy manager 12 to set the desired cache write policy for the cache memory 18(0). The cache controller 16(0) is configured to set a write-back cache policy as the cache write policy for the cache memory 18(0) in response to receipt of an indication that all of one or more other caches 14(X) among a plurality of parallel caches 14(0)-14(X) are not active. The cache controller 16(0) is further configured to set a write-through cache policy for the cache memory 18(0) in response to receipt of an indication that any of the one or more other caches 14(X) among the plurality of parallel caches 14(0)-14(X) are active.

Figure 2:
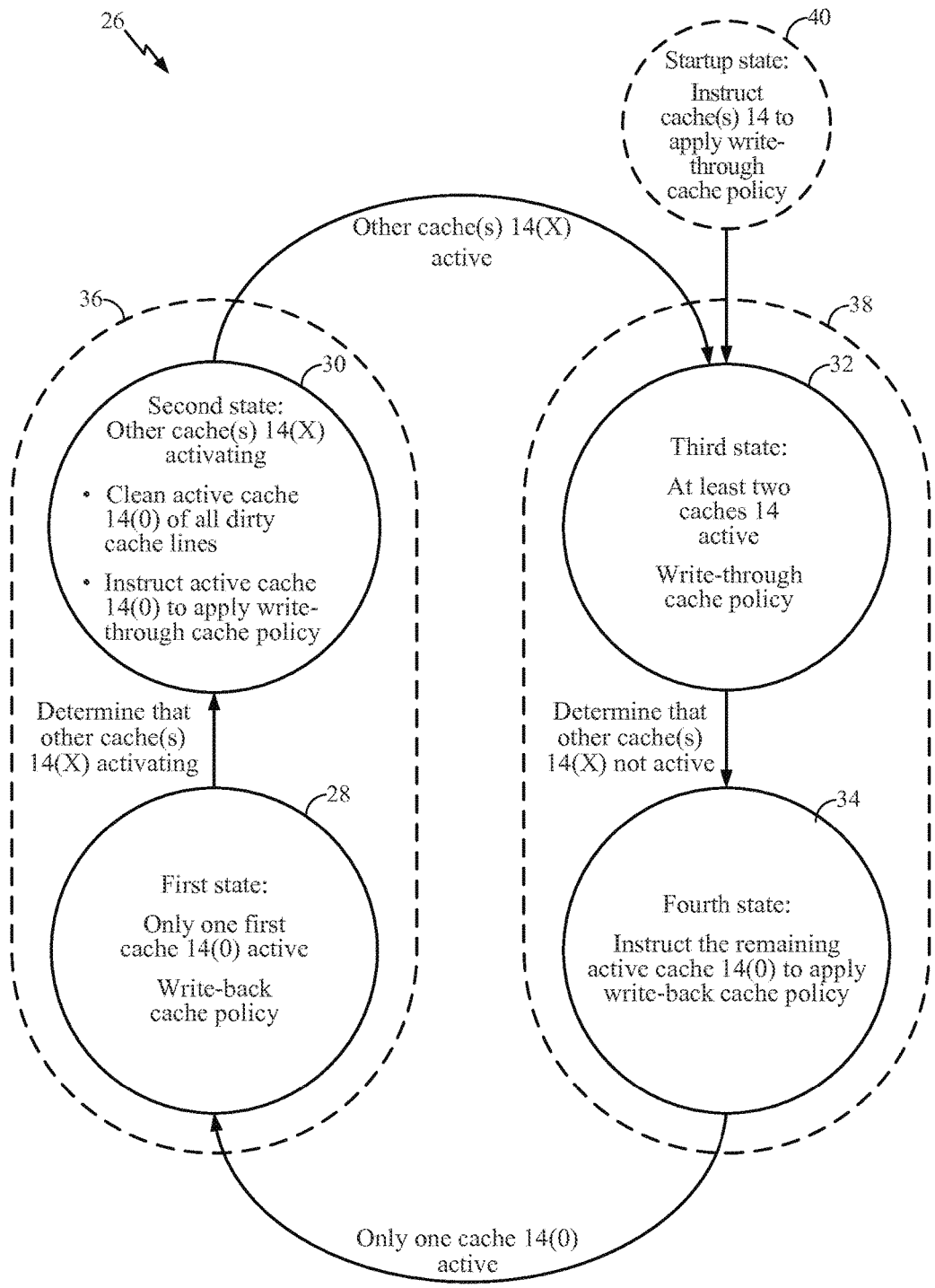
FIG. 2 is an exemplary state machine that may be performed by the cache write policy manager in FIG. 1 to provide a hybrid write-through/write-back cache policy.

The cache write policy manager 12 may be implemented as a state machine. In this regard, FIG. 2 provides an exemplary state machine 26 that may be performed by the cache write policy manager 12 of FIG. 1. In this regard, FIG. 2 illustrates an exemplary state machine 26 for a cache write policy manager 12. In one embodiment, the state machine 26 may be provided having a first state 28, a second state 30, a third state 32, and a fourth state 34.

Referring now to the first state 28, when only one processor core 22(0) among a plurality of parallel processor cores 22(0)-22(X) is active, the local cache 14(0) accessed by the processor core 22(0) may be the only active cache among a plurality of parallel caches 14(0)-14(X). When only one first cache 14(0) is active among a plurality of parallel caches 14(0)-14(X), there is no need to maintain continuous data coherency between the cache 14(0) and the one or more other caches 14(X). Thus, applying a write-back cache policy to the cache 14(0) could conserve power and increase performance of the singly active processor core 22(0). Accordingly, as illustrated in FIG. 2, when only one cache 14(0) is active, the cache write policy manager 12 will be in a first state 28. In the first state 28, the cache write policy manager 12 applies a write-back cache policy to the active cache 14(0). When applying the write-back cache policy, the cache 14(0) can store dirty data.

However, once one or more of the other caches 11(X) are activated, the cache 14(0) will need to be made coherent with the one or more other caches 14(X). Thus, when the cache write policy manager 12 detects that any of the one or more other caches 14(X) are active, the cache write policy manager 12 transitions front the first state 28 to a second state 30. The cache write policy manager 12 may be configured to determine that any of the one or more other caches 14(X) among the plurality of parallel caches 14(0)-14(X) are active by determining that any of the one or more other caches 14(X) are powered. The cache write policy manager 12, may also be configured to determine that any of the one or more other caches 14(X) are active by determining that any of the one or more other processor cores 22(X) configured to access any of the one or more other caches 14(X) are powered and/or active.

In the second state 30, the cache write policy manager 12 makes the initially active cache 14(0) coherent with the one or more other caches 14(X). To achieve data coherency, the cache write policy manager 12 instructs the initially active cache 14(0) to clean all dirty cache lines. The active cache 14(0) may clean all dirty cache lines by writing data stored by any dirty cache lines to a shared memory 20 shared among the plurality of parallel caches 14(0)-14(X). Before, during, or after cleaning all the dirty cache lines to the shared memory 20, the cache write policy manager 12 also instructs the initially active cache 14(0) to apply a write-through cache policy. When also managing the one or more other caches 14(X), the cache write policy manager 12 will also instruct the one or more other caches 14(X) to apply a write-through cache policy. The cleaning of the dirty cache lines of the cache 14(0) may be completed before a newly activating other processor core 22(X) and/or before the newly activating one or more other caches 14(X) become fully active. After the cleaning of any dirty cache lines in the initially active cache 14(0) is completed, the initially active cache 14(0) of the first processor core 22(0) will thereafter maintain coherency with the one or more other caches 14(X). Coherency is maintained through the shared memory 20 in this embodiment. The common lineage shared memory 20 may be a next-level shared memory of the active cache 14(0) and/or the other caches 14(X). Alternatively, there may be one or more intermediate cache(s) and/or intermediate memory(ies) disposed between the active cache 14(0) and the shared memory 20. There may also be one or more intermediate cache(s) and/or intermediate memory(ies) disposed between the one or more other caches 14(X) and the shared memory 20. After the initially active cache 14(0) is updated to be coherent with the shared memory 20, the one or more other processor cores 22(X) and/or the one or more other caches 14(X) may be allowed to become fully active.

As activating one or more other processor cores 22(X) and/or one or more other caches 14(X) takes time, the operations of the second state 30 may be instructed to occur substantially in parallel with the activating of the one or more other processor cores 22(X) and/or the activating of the one or more other caches 14(X).

With continuing reference to FIG. 2, when one or more of the one or more other caches 14(X) become active, the cache write policy manager 12 transitions to a third state 32. In the third state 32, there are at least two parallel caches 14 (e.g., 14(0), 14(X)) active and each of the active parallel caches 14 is applying a write-through cache policy. This allows the active processor cores 22(0)-22(X) to maintain coherency of the active caches 14(0)-14(X) in the shared memory 20 in this embodiment. If additional other cache(s) 14(X) become active (e.g., two or more other caches 14(X) are active), the cache write policy manager 12 remains in the third state 32 and the additional other cache(s) 14(X) are also instructed to apply a write-through cache policy.

At some point, the additional processing capacity of the one or more other processor cores 22(X) may no longer be required by the multiprocessor system 10. When the additional processing capacity of the one or more other processor cores 22(X) is no longer required by the multiprocessor system 10, the multiprocessor system 10 may instruct the one or more other processor cores 22(X) to deactivate in order to conserve power. As a result, the one or more other caches 14(X) may also be powered down and/or deactivated (i.e., made not active) without flushing the one or more other caches 14(X) to the shared memory 20. When the cache policy manager 12 determines that all of the one or more other caches 14(X) are not active (e.g., only one cache 14(0) remains active), the cache write policy manager 12 transitions from the third state 32 to the fourth state 34.

In the fourth state 34, there is no longer a need to keep the singly active cache 14(0) coherent with the one or more other caches 14(X) because the one or more other caches 14(X) are not active and/or not powered. Therefore, in the fourth state 34, the cache write policy manager 12 instructs the remaining active cache 14(0) to apply a write-back cache policy. Dirty data may again be stored in the cache 14(0). As a result, less power is consumed by the multiprocessor system 10. Also, depending on implementation, workload, and/or other design factors, the remaining active processor core 22(0) could have an increased performance under the write-back cache policy.

After instructing the remaining active cache 14(0) to apply a write-back cache policy, the cache write policy manager 12 transitions from the fourth state 34 to the first state 28. The cache write policy manager 12 will remain in the first state 28 as long as the active parallel cache 14(0) is the only active cache 14 among the plurality of parallel caches 14(0)-14(X). The cache write policy manager 12 thereafter continues as herein discussed.

One of ordinary skill in the art will appreciate from this disclosure that the remaining singly active cache 14(0) at the end of a cycle through the first, second, third, and fourth states of the state machine 26 may be a same cache 14 or a different cache 14 among the plurality of parallel caches 14(0)-14(X) than the initially active cache 14(0) at the beginning of the cycle, in other words, a same cache 14 or a different cache 14 may remain active at the end of the cycle through the state machine 26 than was initially active at the beginning of the cycle through the state machine 26.

One of ordinary skill in the art will also appreciate from this disclosure that the cache write policy manager 12 may comprise and operate several state machines 26. For example, a cache write policy manager 12 managing multiple caches 14 may comprise and operate a separate state machine 26 for each cache 14 managed by the cache write policy manager 12.

Furthermore, the previous discussion refers to four separate states of the state machine 26: the first state 28, the second state 30, the third state 32, and the fourth state 34. Generally, the first state 28 and third state 32 may be longer duration states, and the second state 30 and the fourth state 34 may be transitional (i.e. lesser duration) states. The state machine 26 may also be provided with fewer or additional states. For example, in some embodiments, the state machine 26 may be provided as a two-state machine, with the longer duration first state 28 and the transitional second state 30 being provided as a first state 36, and with the longer duration third state 32 and the transitional fourth state 34 being provided as a second state 38.

By way of further example, an optional fifth startup state 40 illustrated FIG. 2 is now discussed. When a cache 14 first powers up, the cache write policy manager 12 may not initially know whether other parallel caches 14 are active. Before a determination of which caches 14 are active/not active can be made, it may be unsafe to assume an activating cache 14 is the only active cache 14. Accordingly, the cache write policy manager 12 may be configured to instruct a cache 14 to apply the write-through cache policy as the default cache write policy until a determination of which caches 14 are active/not active can be made. As a result, data coherency issues are avoided that could otherwise occur if the activating cache 14 applied a write-back cache policy in the presence of other active parallel caches 14.

In this regard, the cache write policy manager 12 may initially start in the startup state 40. In the startup state 40, the cache write policy manager 12 instructs the cache 14 to apply a write-through cache policy. The cache write policy manager 12 then transitions to the third state 32. A determination will then be made regarding which caches 14 are active/not active. If all of the one or more other caches 14(X) among the plurality of parallel caches 14 are not active, then the cache write policy manager 12 of the activating cache 14 will transition to the fourth state 34 (instructing the activating cache 14 to apply a write-back cache policy) and then transition to the first state 28. If any of the one or more other caches 14(X) among the plurality of parallel caches 14 are active, then the cache write policy manager 12 of the activating cache 14 will remain in the third state 38.

Figure 3:
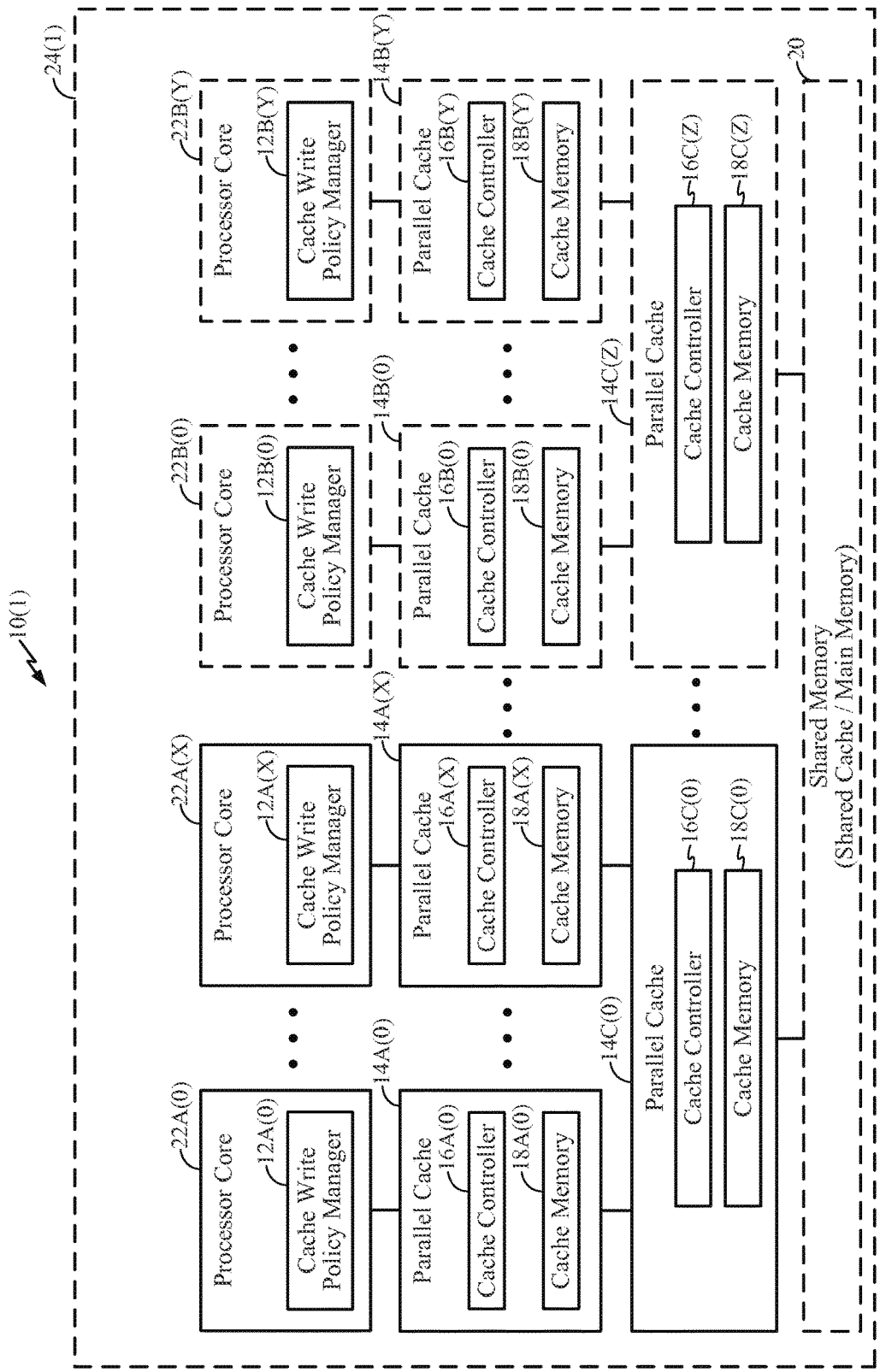
FIG. 3 is a block diagram of another exemplary multiprocessor system having a plurality of processor cores, each processor core comprising a cache write policy manager to provide a hybrid write-through/write-back cache policy.

The multiprocessor system 10 of FIG. 1 illustrates a single cluster of processor cores 22(0)-22(X). However, the multiprocessor system 10 may also be provided as a part of a hierarchical multiprocessor system 10(1). In this regard, FIG. 3 illustrates a hierarchical multiprocessor system 10(1) having a plurality of processor core clusters. The processor cores 22A(0)-22A(X) provide a first cluster of processor cores. The processor cores 22B(0)-22B(Y) form a second processor core cluster. In FIG. 3, the caches 14A(0)-14A(X) are parallel caches, because they share a common lineage parallel cache 14C(0). The caches 14B(0)-14B(Y) are parallel caches, because they share a common lineage parallel cache 14C(Z). The caches 14C(0)-14C(Z) are parallel caches, because they share a common lineage shared memory 20. The caches 14A(0)-14A(X) and 14B(0)-14B(X) are also parallel caches because they share a common lineage shared memory 20. The hierarchical multiprocessor system 10(1) may be provided on a semiconductor die 24(1). The elements in FIG. 3 have similar element numbers to the elements of FIG. 1 and operate in the same manner as the elements in FIG. 1, except whereas herein described.

As illustrated in FIG. 3, the cache write policy manager 12 of FIG. 1 may be provided as a plurality of cache write policy managers 12A(0)-12A(X), 12B(0)-12B(Y). In the embodiment illustrated in FIG. 3, each processor core 22 (e.g., processor cores 22A(0)-22A(X) and 22B(0)-22B(Y)) contains a cache write policy manager 12 (e.g., 12A(0)-12A(X) and 12B(0)-12B(Y), respectively). The cache write policy manager 12 contained in each processor core 22 is configured to determine whether at least two caches 14 among the plurality of parallel caches 14A(0)-14A(X), 14B(0)-14B(Y) are active. The cache write policy manager 12 contained in each processor core 22 is also configured to instruct a parallel cache 14 accessed by its processor core 22, regarding which cache write policy to apply.

In this regard in FIG. 3, when only a first processor core 22A(0) is active, cache write policy manager 12A(0) may instruct the parallel cache 14A(0) to apply a write-back cache policy. The cache write policy manager 12A(0) may also instruct the parallel cache 14A(0) to apply a write-back cache policy if none of the one or more other processor cores 22B(0)-22B(Y) in the second processor core cluster are active. When processor core 22A(X) powers on, the cache write policy manager 12A(X) determines that the parallel cache 14A(0) is already active and therefore instructs the parallel cache 14A(X) to apply a write-through cache policy. When the processor core 22A(X) powers up, the cache write policy manager 12A(0) also determines that the processor core 22A(X) is activating and therefore instructs the already active cache 14A(0) to clean its cache lines of all dirty data. The parallel cache 14A(X) will then clean all of its dirty cache lines by writing data stored in any dirty cache lines of the parallel cache 14A(0) to a parallel cache 14C(0) shared between the processor cores 22A(0)-22A(X) of the first processor core cluster.

Once the cleaning of the dirty cache lines of the parallel cache 14A(X) is completed, the parallel cache 14A(0) is prepared to maintain data coherency with the parallel cache 14A(X) of the processor core 22A(X). In this regard, both parallel caches 14A(0), 14A(X) will apply a write-through cache policy to write any data stored in their local cache memories 18A(0), 18A(X) to the parallel cache 14C(0).

The state machine 26 of FIG. 2 may also be applied to parallel caches, such as parallel caches 14C(0)-14C(Z). At this point, there are processor cores 22 active in a first processor cluster (e.g., processor cores 22A(0), 22A(X)). However, there are no other processor cores 22B(0)-22B(Y) active in one or more other processor clusters. As a result, a parallel cache 14C(0) is active and there are no other parallel cache(s) 14C(Z) active. Because there are no other parallel cache(s) 14C(Z) active, the parallel cache 14C(0) is instructed to apply a write-back cache policy. The parallel cache 14C(0) may continue to apply a write-back cache policy for as long as all other parallel caches (e.g., the parallel cache 14C(Z)) parallel to the parallel cache 14C(0) remain inactive (i.e., not active).

When a processor core 22B(0) is activated in the second processor core cluster, the state machine 26 of FIG. 2 is used to set the policies of the parallel caches 14C(0)-14C(Z) in a deeper cache level. When the processor core 22B(0) (in an other processor core cluster) is powered on and/or otherwise activated, the parallel cache 14B(0) and the parallel cache 14C(Z) will also power on and become active. The cache write policy manager 12B(0) determines that the parallel caches 14A(0)-14A(X) are active and therefore instructs the parallel cache 14B(0) to apply a write-through cache policy. The cache write policy manager 12B(0) also determines that the parallel cache 14C(0) is active and therefore instructs the parallel cache 14C(Z) to apply a write-through cache policy.

The cache write policy manager 12A(0) also determines that the processor core 22B(0) and/or the parallel cache 14B(0) is active and therefore instructs the parallel cache 14C(0) to apply a write-through cache policy. This allows the parallel cache 14C(0) to maintain coherency with the newly activated parallel cache 14C(Z). In this regard, the parallel cache 14C(0) and the parallel cache 14C(Z) will each write-through data stored in their cache memories 18C(0), 18C(Z) to the shared memory 20. When all active processor cores 22B of the other processor core cluster (processor core 22B(0) in this example) are deactivated, the cache write policy manager 12A(0) will determine that no other processor cores 22B(0)-22B(Y) and/or parallel caches 14B(0)-14B(Y) of any other processor core clusters are active. When this occurs, the cache write policy manager 12A(0) may instruct the parallel cache 14C(0) to apply a write-back cache policy. Applying a write-back cache policy may conserve power and/or enhance the performance of the processors 12A(0)-12A(X) in the only remaining active processor core cluster (i.e., processors 12A(0)-12A(X)). One of ordinary skill in the art will appreciate from this disclosure that the state machine 26 of FIG. 2 may be applied at any level of a hierarchical cache system. One of ordinary skill in the art will also appreciate from this disclosure that each processor core cluster in FIG. 3 may comprise two or more processor cores 22.

One of ordinary skill in the art will also appreciate from this disclosure that the hierarchical multiprocessor system 10(1) may comprise two or more processor core clusters. The hierarchical multiprocessor system 10(1) illustrated in FIG. 3 illustrates three levels of caches. However, one of ordinary skill in that art will appreciate that the state machine 26 may also be applied to deeper cache hierarchies.

Figure 4:
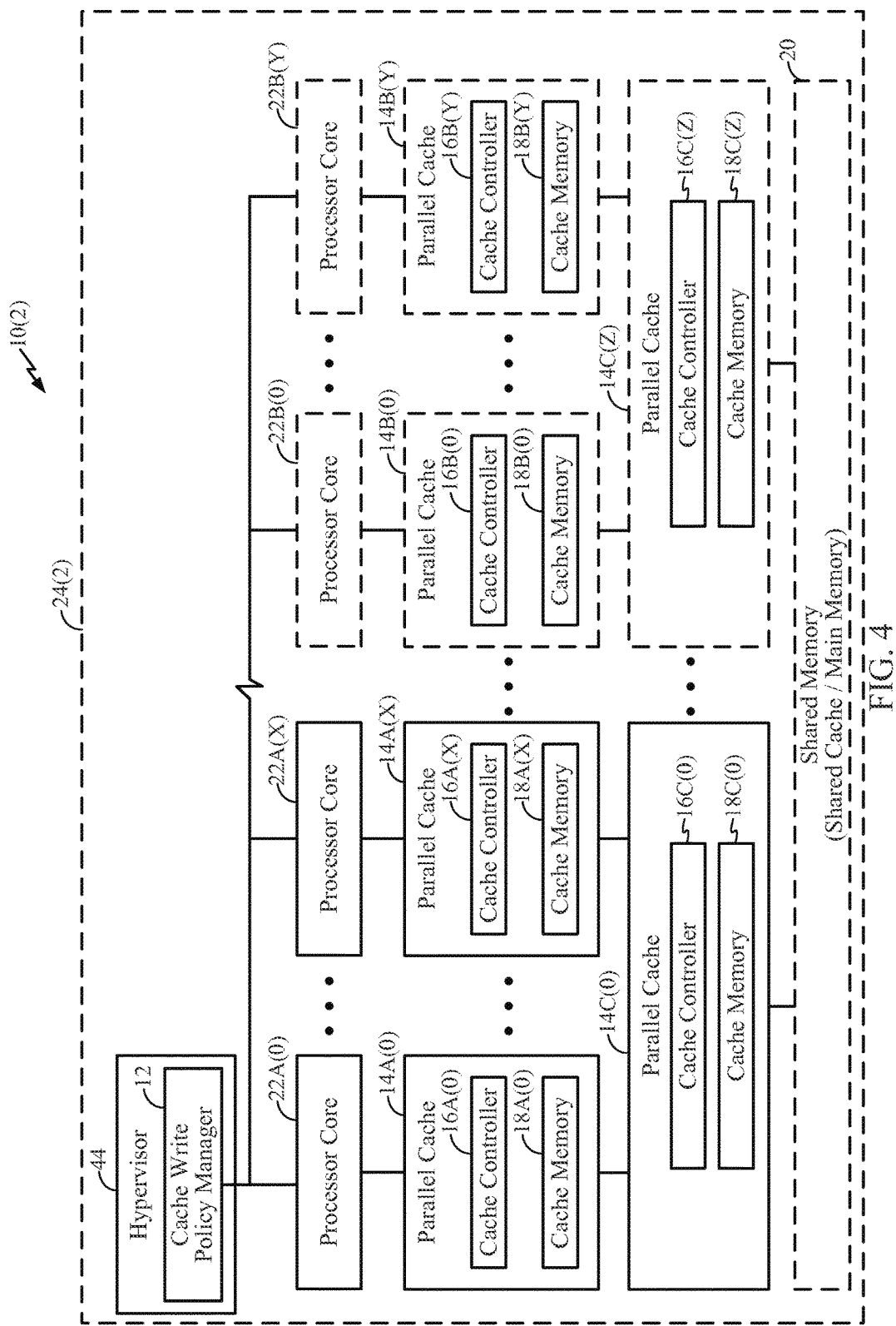
FIG. 4 is a block diagram of another exemplary multiprocessor system employing a hypervisor comprising a cache write policy manager to provide a hybrid write-through/write-back cache policy.

The processor cores 22A(0)-22A(X), 22B(0)-22B(Y) illustrated in FIG. 3 each contain their own cache write policy manager 12A(0)-1.2A(X), 12B(0)-12B(Y). However, the cache write policy manager 12 may also be provided outside the processor cores 22A(0)-22A(X), 22B(0)-22B (Y). In this regard, FIG. 4 illustrates a multiprocessor system 10(2) comprising a cache write policy manager 12 integrated into a hypervisor 44. The hypervisor 44 can determine whether any of the processor cores 22A(0)-22A(X), 22B (0)-22B(Y) and/or parallel caches 14A(0)-14A(X), 14B(0)-14B(Y) are active. The hypervisor may also determine whether any of the parallel caches 14C(0)-14C(Z) are active. The hypervisor 44 may also control the activation and deactivation of the processors cores 22A(0)-22A(X), 22B (0)-22B(Y), and/or the activation and deactivation of their respective processor core clusters. In one embodiment, the hypervisor 44 is provided as separate circuitry on a semiconductor die 24(2). In another embodiment, the hypervisor 41 is provided in software. When implemented in software, the hypervisor 44 may execute on a separate processor core 22 from the processor cores 22A(0)-22A(X), 22B(0)-22B (Y). However, the hypervisor 44 may also execute on one or more of the processor cores 22A(0)-22A(X), 22B(0)-22B (Y).

Figure 5:
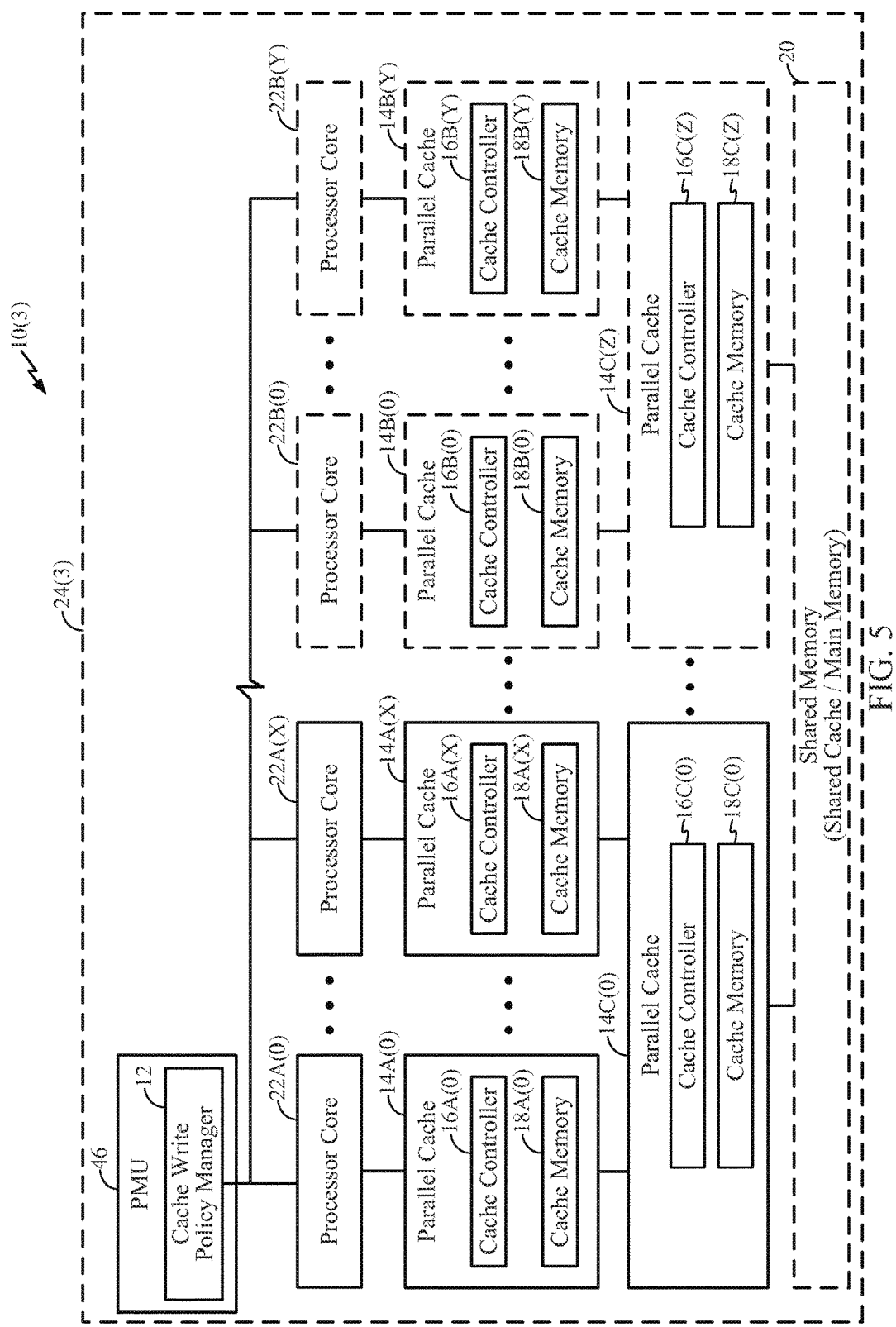
FIG. 5 is a block diagram of another exemplary multiprocessor system employing a power management unit (PMU) comprising a cache write policy manager to provide a hybrid write-through/write-back cache policy.

As illustrated by multiprocessor system 10(3) in FIG. 5, the cache write policy manager 12 may also be integrated into a power management unit (PMU) 46. The PMU 16 may be implemented as separate circuitry of a semiconductor die 24(3). The PMU 46 controls the powering on and/or powering off of processor cores 22A(0)-22A(X), 22B(0)-22B(Y) and/or parallel caches 14A(0)-14A(X), 14B(0)-14B(Y). The PMU 46 may or may not implement separate state machines 26 for affecting parallel caches 14A(0)-14A(X), 14B(0)-14B (Y) and/or parallel caches 14C(0)-14C(Z).

The cache write policy manager 12 and/or parallel caches 14, according to embodiments disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
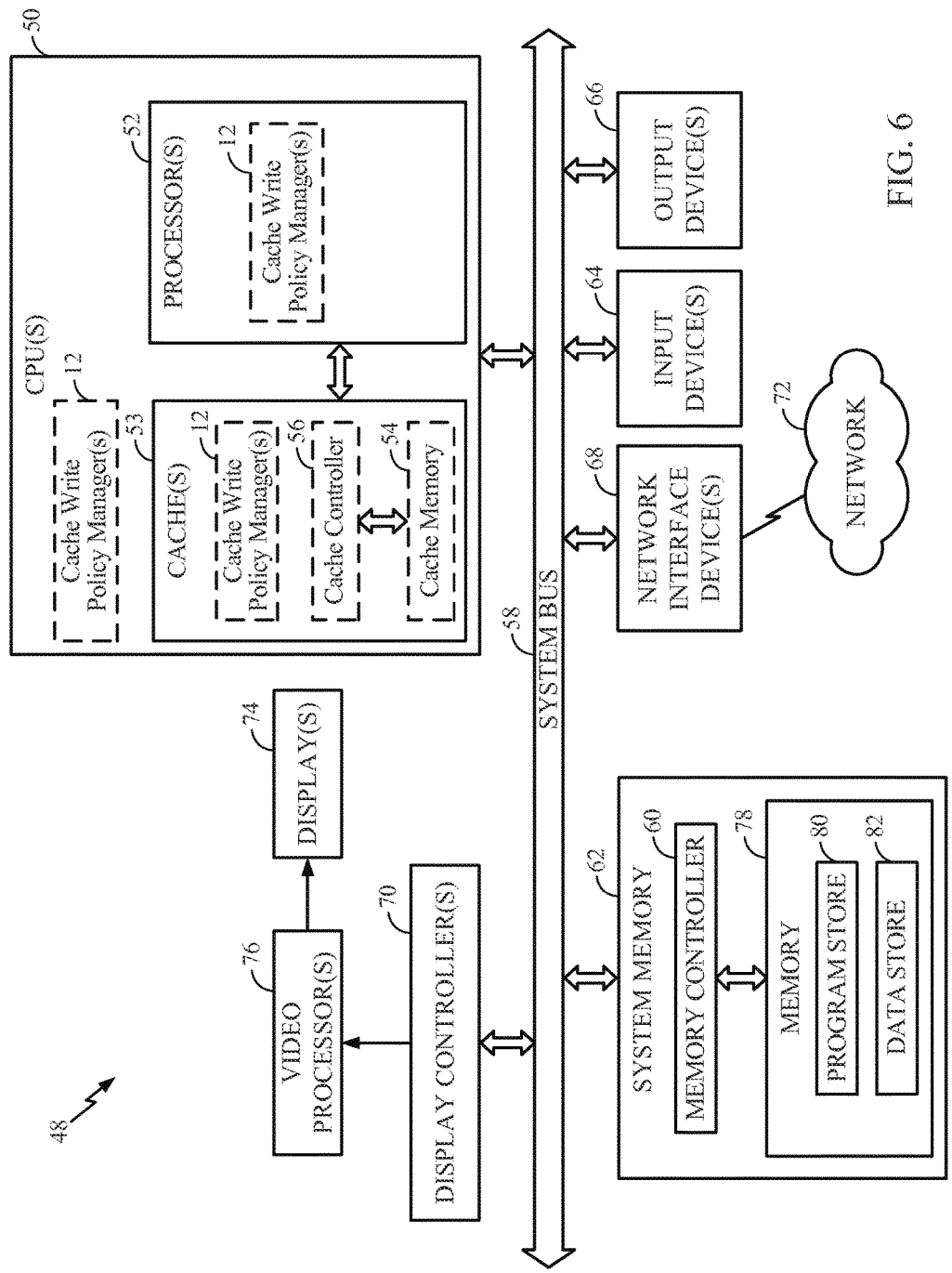
FIG. 6 is a block diagram of an exemplary processor-based system that includes a cache write policy manager according to the embodiments disclosed herein.

In this regard, FIG. 6 illustrates an example of a processor-based system 48. In this example, the processor-based system 48 includes one or more central processing units (CPU(s)) 50, each including one or more processors 52. The CPU(s) 50 may have cache(s) 53 coupled to the processor(s) 52 for rapid access to temporarily stored data. As herein discussed, each cache 53 may contain a cache controller 56 and cache memory 54, controlled as herein discussed. The CPU(s) 50 is coupled to a system bus 58 and can intercouple master devices and slave devices included in the processor-based system 48. As is well known, the CPU(s) 50 communicates with these other devices by exchanging address, control, and data information over the system bus 58. For example, the CPU(s) 50 can communicate bus transaction requests to the memory controller 60, as an example of a slave device. Although not illustrated in FIG. 6, multiple system buses 58 could be provided, wherein each system bus 58 constitutes a different fabric.

Other master and slave devices can be coupled to the system bus 58. As illustrated in FIG. 6, these devices can include a system memory 62, one or more input devices 64, one or more output devices 66, one or more network interface devices 68, and one or more display controllers 70, as examples. The input device(s) 64 can include any type of input device, including but not limited to input keys, switches, voice processors, etc. The output device(s) 66 can include any type of output device, including but not limited to audio, video, other visual indicators, etc. The network interface device(s) 68 can be any device(s) configured to allow exchange of data to and from a network 72. The network 72 can be any type of network, including but not limited to a wired or wireless network, a private or public network, a local area network (LAN), a wide local area network (WLAN), and the Internet. The network interface device(s) 68 can be configured to support any type of communication protocol desired. As herein discussed, the CPU(s) 50 may also include one or more cache write policy managers 12. As illustrated in FIG. 6, the one or more cache write policy managers 12 may be integral to the cache(s) 53 and/or integral to the processor(s) 52. As also illustrated in FIG. 6, the one or more cache write policy managers 12 may also be provided in the CPU(s) 50 separately from the cache(s) 53 and/or processor(s) 52. For example, one or more separately-provided cache write policy managers 12 may be provided integral to a hypervisor 44 and/or a PMU 46 of the CPU(s) 50.

The CPU(s) 50 may also be configured to access the display controller(s) 70 over the system bus 58 to control information sent to one or more displays 74. The display controller(s) 70 send information to the display(s) 74 to be displayed via one or more video processors 76, which process the information to be displayed into a format suitable for the display(s) 74. The display(s) 74 can include any type of display, including but not limited to a cathode ray tube (CRT), a liquid crystal display (LCD), a plasma display, etc. The system memory 62 may comprise a memory controller 60 for accessing memory 78 of the processor-based system 48. The memory 78 may comprise a non-transitory computer-readable medium. The computer-readable medium may have stored thereon computer-executable instructions to cause the processor(s) 52 to implement methods herein described for providing a hybrid write-through/write-back cache policy for one or more of a plurality of caches 53. In this regard, the memory 78 may comprise a program store 80 and/or a data store 82.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The cache write policy manager(s), cache controller(s), and/or cache(s) described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processing core (herein also called a core, processing core, and/or processor) may be a microprocessor, but in the alternative, the processing core may be any conventional processor, controller, microcontroller, or state machine. A processing core may also be implemented as a combination of computing devices, e.g. a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A cache write policy manager circuit configured to:
   determine whether at least two operational caches among a plurality of parallel operational caches are active;
   instruct an active operational cache among the plurality of parallel operational caches to apply a write-back cache policy in response to all of one or more other operational caches among the plurality of parallel operational caches not being active; and
   instruct the active operational cache among the plurality of parallel operational caches to apply a write-through cache policy in response to any of the one or more other operational caches among the plurality of parallel operational caches being active.

2. The cache write policy manager circuit of claim 1 further configured to instruct the active operational cache to clean all dirty cache lines if any of the one or more other operational caches among the plurality of parallel operational caches are activated.

3. The cache write policy manager circuit of claim 2 configured to instruct the active operational cache to clean all dirty cache lines by instructing the active operational cache to write data stored by any dirty cache lines to a shared memory.

4. The cache write policy manager circuit of claim 1 configured to determine if any of the one or more other operational caches among the plurality of parallel operational caches are active by determining if any of one or more processor cores configured to access any of the one or more other operational caches are powered.

5. The cache write policy manager circuit of claim 1 configured to determine if all of the one or more other operational caches among the plurality of parallel operational caches are not active by determining if all of one or more processor cores configured to access any of the one or more other operational caches are not powered.

6. The cache write policy manager circuit of claim 1, wherein the active operational cache is configured to apply the write-through cache policy as a default policy.

7. The cache write policy manager circuit of claim 6, wherein the active operational cache is configured to apply the write-through cache policy as the default policy in response to power-up of the active operational cache.

8. The cache write policy manager circuit of claim 1 integrated into at least one of: a processing core, a hypervisor, and a power management unit (PMU).

9. The cache write policy manager circuit of claim 1 integrated into a semiconductor die.

10. The cache write policy manager circuit of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the cache write policy manager is integrated.

11. The cache write policy manager circuit of claim 1, wherein each parallel operational cache of the plurality of parallel operational caches shares one or more common lineages, either directly or indirectly through one or more intermediate operational caches or one or more intermediate memories.

12. An cache write policy manager circuit for providing a hybrid write-through/write-back cache policy for a cache, comprising:
  means for determining whether at least two operational caches among a plurality of parallel operational caches are active;
  means for instructing an active operational cache among the plurality of parallel operational caches to apply a write-back cache policy in response to all of one or more other operational caches among the plurality of parallel operational caches not being active; and
  means for instructing the active operational cache among the plurality of parallel operational caches to apply a write-through cache policy in response to any of the one or more other operational caches among the plurality of parallel operational caches being active.

13. A method for providing a hybrid write-through/write-back cache policy for a cache, comprising:
  determining whether at least two operational caches among a plurality of parallel operational caches are active;
  instructing an active operational cache among the plurality of parallel operational caches to apply a write-back cache policy in response to all of one or more other operational caches among the plurality of parallel operational caches not being active; and
  instructing the active operational cache among the plurality of parallel operational caches to apply a write-through cache policy in response to any of the one or more other operational caches among the plurality of parallel operational caches being active.

14. The method of claim 13, further comprising instructing the active operational cache to clean all dirty cache lines by instructing the active operational cache to write data stored by any dirty cache lines to a shared memory.

15. The method of claim 13 comprising determining if any of the one or more other operational caches among the plurality of parallel operational caches are active by determining if any of one or more processor cores configured to access any of the one or more other operational caches are powered.

16. The method of claim 13 comprising determining if all of the one or more other operational caches among the plurality of parallel operational caches are not active by determining if all of one or more processor cores configured to access any of the one or more other operational caches are not powered.

17. The method of claim 13, further comprising instructing the active operational cache to apply the write-through cache policy as a default policy.

18. The method of claim 17, further comprising instructing the active operational cache to apply the write-through cache policy as the default policy in response to power-up of the active operational cache.

19. The method of claim 13, wherein each parallel operational cache of the plurality of parallel operational caches shares one or more common lineages, either directly or indirectly through one or more intermediate operational caches or one or more intermediate memories.

20. The method of claim 13 further comprising instructing the active operational cache among the plurality of parallel operational caches to apply the write-back cache policy in response to all of the one or more other operational caches among the plurality of parallel operational caches becoming inactive following all of the one or more other operational caches among the plurality of parallel operational caches being active.

21. A cache, comprising:
  an operational cache memory; and
  a cache controller configured to set a cache write policy of the operational cache memory,
  wherein the cache controller is further configured to:
    set a write-back cache policy for the operational cache memory in response to receipt of an indication that all of one or more other operational caches among a plurality of parallel operational caches are not active; and
    set a write-through cache policy for the operational cache memory in response to receipt of an indication that any of the one or more other operational caches among the plurality of parallel operational caches are active.

22. The cache of claim 21, wherein the cache controller is further configured to clean all dirty cache lines of the operational cache memory in response to receipt of the indication that any of the one or more other operational caches among the plurality of parallel operational caches are activated.

23. The cache of claim 22, wherein the cache controller is configured to clean all dirty cache lines of the operational cache memory by writing data stored by any dirty cache lines of the operational cache memory to a shared memory.

24. The cache of claim 21, wherein each parallel operational cache of the plurality of parallel operational caches shares one or more common lineages, either directly or indirectly through one or more intermediate operational caches or one or more intermediate memories.

25. A multiprocessor system, comprising:
a plurality of parallel operational caches;
a shared memory shared by the plurality of parallel operational caches; and
a cache write policy manager circuit configured to:
determine whether at least two operational caches among the plurality of parallel operational caches are active;
instruct an active operational cache among the plurality of parallel operational caches to apply a write-back cache policy in response to all of one or more other operational caches among the plurality of parallel operational caches not being active; and
instruct the active operational cache among the plurality of parallel operational caches to apply a write-through cache policy in response to any of the one or more other operational caches among the plurality of parallel operational caches being active.

26. The multiprocessor system of claim 25, wherein the shared memory is at least one of a shared cache and a main memory.

27. A non-transitory computer-readable medium having stored thereon computer-executable instructions to cause a processor to implement a method for providing a hybrid write-through/write-back cache policy for a plurality of parallel operational caches, comprising:
determining whether at least two operational caches among a plurality of parallel operational caches are active;
instructing an active operational cache among the plurality of parallel operational caches to apply a write-back cache policy in response to all of one or more other operational caches among the plurality of parallel operational caches not being active; and
instructing the active operational cache among the plurality of parallel operational caches to apply a write-through cache policy in response to any of the one or more other operational caches among the plurality of parallel operational caches being active.

28. The computer-readable medium of claim 27 configured to cause a hypervisor executed by the processor to implement the method for providing the hybrid write-through/write-back cache policy for the plurality of parallel operational caches.

* * * * *